Figure 1A:
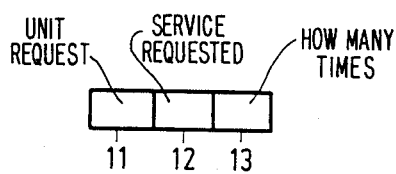

United States Patent [19]

Dams

[11] Patent Number: 4,977,555

[45] Date of Patent: Dec. 11, 1990

[54] ASYNCHRONOUS DUPLEX DATA COMMUNICATION FOR REQUESTING SERVICES

[75] Inventor: Franciscus J. L. Dams, Hilversum, Netherlands

[73] Assignee: U.S. Philips Corporation, New York, N.Y.

[21] Appl. No.: 297,822

[22] Filed: Jan. 13, 1989

[30] Foreign Application Priority Data

Jan. 20, 1988 [NL] Netherlands .......................... 8800124

[51] Int. Cl.[5] .............................................. H04L 5/14
[52] U.S. Cl. .......................................... 370/29; 370/79
[58] Field of Search ....................... 370/29, 79, 91, 92,
370/24, 31, 32; 375/121; 340/825.5, 825.29;
364/400, 407

[56] References Cited

U.S. PATENT DOCUMENTS

| | | | |
|---|---|---|---|
| 3,934,093 | 1/1976 | Thyselius | 370/91 |
| 4,432,089 | 2/1984 | Wurzburg et al. | 370/29 |
| 4,445,213 | 4/1984 | Baugh et al. | 370/79 |
| 4,580,261 | 4/1986 | Pelotte | 370/79 |
| 4,633,489 | 12/1986 | Morishita | 375/121 |
| 4,644,525 | 2/1987 | Ellis et al. | 370/29 |
| 4,740,957 | 4/1988 | Cassidy et al. | 370/92 |
| 4,750,169 | 6/1988 | Carse et al. | 370/29 |

FOREIGN PATENT DOCUMENTS

0192894 9/1986 European Pat. Off. .

OTHER PUBLICATIONS

C. M. Smits, "Telephone Management Functions", Philips Telecommunication Review, vol. 43, No. 2, Jun., 1985, pp. 172-181.

Primary Examiner—Douglas W. Olms
Assistant Examiner—Alpus H. Hsu
Attorney, Agent, or Firm—Anne E. Barschall; Jack E. Haken

[57] ABSTRACT

A method of asynchronous duplex data communication between a pair of stations, a PABX and a telephone management system (TMS) relating to specific services to be performed by one of the two stations, the one station requesting, by means of an initialization request, a specific service and the number of times that this service is to be performed simultaneously, and the other station, depending on its capacity, allocating, by means of an initialization response, a number of times that the service can be performed simultaneously, which number is equal to or smaller than the requested number. After the number is allocated, it is possible to proceed by means of transaction messages to the actual performing of the services. These services for example apply to specific applications of a telephone system in a hotel.

10 Claims, 2 Drawing Sheets

| TMS → PABX | | PABX → TMS | |
|---|---|---|---|
| 1 | | 00 81 08 | |
| 2 | 80 81 00 | | |
| 3 | | | |
| 4 | | 00 82 04 | |
| 5 | | 00 83 03 | |
| 6 | 80 83 03 | 00 84 03 | |
| 7 | 80 82 04 | | |
| 8 | 81 83 00 01 01 11 00 | 01 83 00 01 02 22 23 15 2A 00 FF FF FF FF FF FF FF FF | |
| 9 | 00 04 0A | | |
| 10 | | | |
| 11 | | | |
| 12 | 01 04 00 01 02 22 14 09 22 23 58 | 80 04 03 | |
| 13 | | | |
| 14 | 01 04 00 01 02 22 14 09 22 23 58 | 81 04 00 01 01 11 04 | |
| 15 | | | |
| 16 | 00 02 0A | 81 04 00 01 01 11 00 | |
| 17 | | | |
| 18 | 01 02 00 01 02 22 14 02 31 04 | 80 02 05 | |
| 19 | 01 02 01 01 02 22 14 03 31 04 | | |
| 20 | 01 02 02 01 02 22 14 04 31 04 | | |
| 21 | | 81 02 01 01 01 01 11 05 | |
| 22 | 01 02 01 01 02 22 14 05 31 04 | | |
| 23 | 80 84 00 | 00 84 03 | |
| 24 | | | |
| 25 | | 81 02 02 01 01 01 11 00 | |
| 26 | | 81 02 01 01 01 01 11 00 | |
| 27 | | 81 02 00 01 00 01 11 07 | |

FIG. 3

ASYNCHRONOUS DUPLEX DATA COMMUNICATION FOR REQUESTING SERVICES

The invention relates to a method of asynchronous duplex data communication between two stations through a common communication channel, this communication relating to a plurality of services to be performed by one of the two stations.

A system operating according to such a method is known from the European Patent Application EP-A-O 192 894. With this known method the one station is a PABX exchange providing the link between the external telephone lines of a local telephone network and a plurality of internal telephone lines of a private telephone network, while the other station is the central processing unit (CPU) of a personal computer; the communication channel comprises the common data bus of the personal computer, through which bus data communication can be effected between the CPU and the various peripheral units of the personal computer, such as the memory, the printer and the display unit, and also between the CPU and the PABX. It is an object of the known method to intergrate thus the PABX with the personal computer so that the CPU thereof can also provide the control of the PABX, as a consequence of which the latter can actually be regarded as a peripheral unit of the personal computer and for example the printer, the display unit and the memories can also be used for the benefit of the PABX for performing specific services, such as call recording, call accounting, automatic telephone call response and the like.

The invention relates to the method by which such services can be performed, specifically in the case when the one station is a PABX and the other station a telephone management system (TMS). Such telephone management systems are described, for example, in an article by C. N. Smits: "Telephone Management Functions", Philips Telecommunication Review, Vol. 43, No. 2, June 1985, pp. 172–181.

Thereto, it is an object of the invention to provide a method of the above type in which one of the two stations initializes a communication link by transmitting through the channel an initialization request comprising data that are representative of the requested service and the number of times n (n=1, 2, 3, ... n) that simultaneous performing of this service is requested (the window) and in which the other station sends back through the channel an initialization response comprising data that are representative of the requested service and the allocated number of times m (m=0, 1, 2, 3, ... m) that a simultaneous performing of the requested service is feasible, with m≦n.

If the window allocated to the relevant service is ≠ 0, messages respecting the relevant service can be exchanged between the two stations, i.e. the so-called transaction. According to another aspect of the invention the transaction messages are composed of a byte sequence, the first byte indicating whether a transaction request or response is concerned, the second byte indicating the relevant service, the third byte indicating a unique identification code for this specific service between these two stations, the fourth byte indicating the function code of the service and the fifth byte the number of parameters still to follow in the messages.

The invention also provides a station for implementing the method according to the invention comprising means for transmitting and receiving a three-byte initialization request or response, means for establishing whether the initialization is successful and means for transmitting and receiving transaction messages.

Figure 1B:
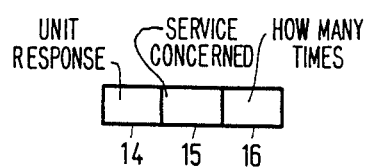
Figure 2:
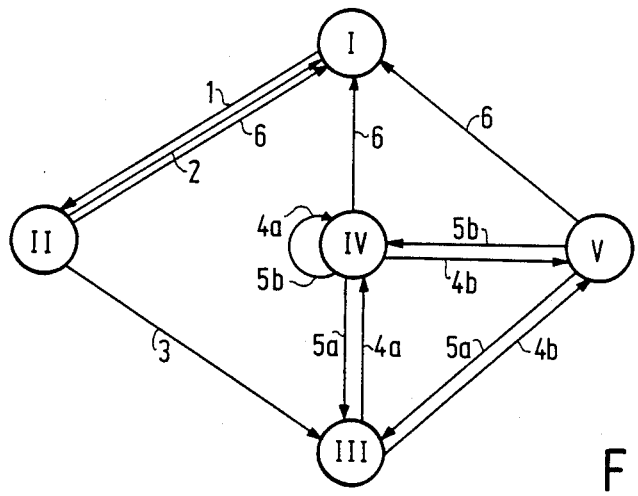
Figure 4:
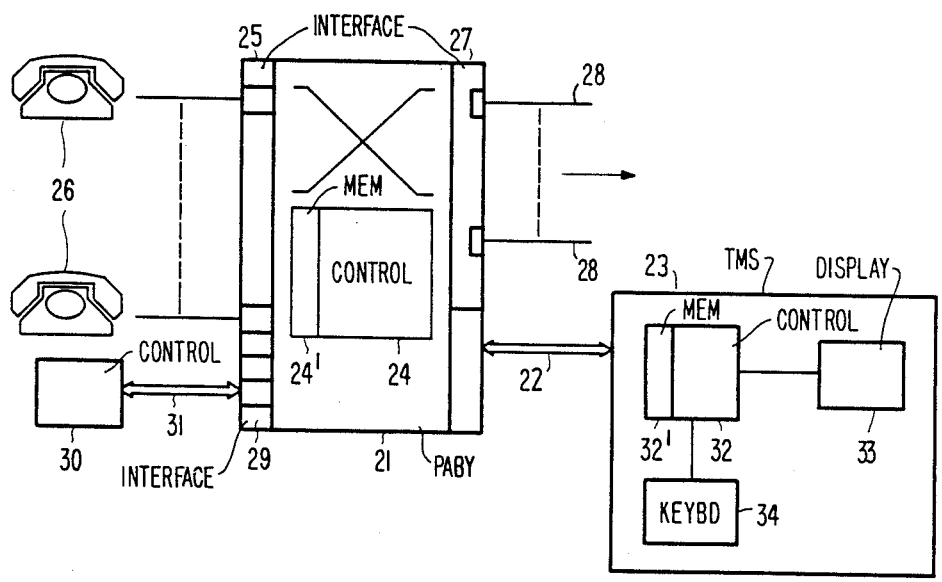

With the measures according to the invention an efficient communication between various types of PABX and the various types of TMS is feasible, as will be further explained hereinbelow by means of a drawing with reference to an embodiment, in which drawing:

FIG. 1a shows a possible structure of an initialization request for a specific service, FIG. 1b shows a possible structure of an initialization response to the request according to FIG. 1a, FIG. 2 shows a status diagram representing the possible conditions when establishing a connection between two stations, and FIG. 3 shows the exchange of a series of possible messages between the PABX and the TMS and between the TMS and the PABX, FIG. 4 shows a block diagram of the structure of a PABX and a TMS which are suitable for implementing the method according to the invention.

FIG. 1a shows the structure of an initialization request consisting of three bytes 11, 12 and 13. Byte 11 indicates that an initialization request is concerned, byte 12 indicates which service is requested and byte 13 indicates how many times this type of service is requested to be performed simultaneously, i.e. the so-called window.

FIG. 1b shows the structure of the response transmitted in reaction to the initialization request according to FIG. 1a, again consisting of three bytes 14, 15 and 16. Byte 14 indicates that an initialization response is concerned, byte 15 indicates which service is concerned, which byte is thus equal to byte 12, and byte 16 indicates the allocated number of times the service can be performed simultaneously, i.e. the so-called allocated window. For example, this number can be equal to zero if, with a TMS as the requesting station and the PABX as the responding station, this PABX does not recognize the service concerned. The number can also be smaller than the requested window size because, for example, the same service has already been allocated to other TMS systems, so that the maximum number of times that the service can be performed simultaneously has already been reached or because the number of times that the PABX can simultaneously perform this service is smaller than the requested number of times.

After the exchange of messages according to FIG. 1a and FIG. 1b, a connection has basically been established and, subsequently, the messages proper can be exchanged. Such an exchange of messages between the two stations will be called a transaction hereinafter.

FIG. 2 diagrammatically shows the states that can be assumed by the system according to the invention comprising a pair of stations and one communication channel.

These states are denoted I to V in FIG. 2, and relate to:

I: channel free, service unavailable;
II: an initialization is being effected;
III: channel free, service is available;
IV: one or more transactions are being effected, there is room left for more transactions;
V: one or more transactions are being effected, there is no room left for more transactions.

The change from one to the other state, or sometimes back to the same state, takes place as a result of a number of events indicated in FIG. 2 by the arrows 1, 2, 3, 4a, 4b, 5a, 5b and 6 and having the meaning described hereinbelow. For brevity, R is the station requesting the services and D the responding station performing the service.

1: R transmits request for initialization;
2: D responds to request for initialization and allocates a window=0;
3: D responds to request for initialization and allocates a window>0;
4: R transmits request for transaction and
   (a) ther are still transaction-identification codes free or
   (b) there no more transaction-identification codes free;
5: D responds to request for transaction and
   (a) this response is the response to the latest active request for a transaction, or
   (b) there are still one or more active requests for transactions;
6: The allocated time interval has passed; no or no valid response was received in a predetermined time interval after the transmission of the request.

In each state I to V that the system has assumed, only those events are recognized that may belong to the relevant state; all other events are disregarded with the exception of event I, the initialization request, which is recognized in each state and results in this system ending up in state II.

The allocated time interval, in which a request is to be reacted to, is actually of minor importance. In practice, however, a time interval of for example 150 seconds is chosen. It is important, however, that a specific time interval be agreed upon in which a response is to be received, because otherwise a number of transactions can remain active for an unspecified length of time, so that no room or insufficient room remains for new transactions with respect to the same service.

It should be pointed out that FIG. 2 shows the diagram of the condition of no more than one service. However, with the method according to the invention, the communication relating to different services, whose messages can be transmitted crossing each other, can be effected simultaneously. This is also the reason why the messages always contain an indication as to the service concerned and also an identification code for that specific service. So, the system behaves as a plurality of point-to-point connections, with one connection per service.

FIG. 3 shows an example of an exchange of 27 messages between a PABX and a TMS system, the left-hand column in the Figure providing the messages from the TMS to the PABX and the right-hand column the messages from the PABX to the TMS, which messages consist of initialization messages (lines 1 to 7, 10, 11 and 16) and transaction messages on the remaining lines.

The data on the various lines are represented in a hexadecimal form, two characters always forming one byte.

According to the example, byte 11 is intended for an initialization request, whose structure is shown in FIG. 1a, equal to 00, while byte 14 for the subsequent initialization response is equal to 80.

The code for the various services as indicated in the bytes 12 and 15 are:
81: service indication on the display screen;
82: room status;
83: message management;
84: night watchman;
04: direct automatic calling and
02: wake-up service.

In the scope of the present invention it is of minor importance to describe exactly the contents of the various services. For a further explanation of these services the reader is referred to the abovementioned article in Philips Telecommunication Review.

The bytes 13 and 16 which indicate the requested and allocated window respectively, can vary from 00 implying that the window is 0, to FE implying that the window is 254. All initialization requests and responses consist of three bytes, as shown in the FIGS. 1 and 3. Transaction requests and responses, however, can consist of a much larger number of bytes.

On line 8 the first transaction request is represented for service 83, the first byte, 01, indicating that a transaction request is concerned, the second byte, 83, indicating the service and the third byte the identification code for this transaction in the relevant window. The fourth byte, 01, relates to the function code further to be explained hereinbelow, the fifth byte, 02, indicates how many parameters follow, thus 2 in this case, the first parameter being equal to 22, 23, 15. Herein, the first part of the first byte, 2, indicates that a so-called type-2 parameter is concerned, which stands for a sequence of digits and the second part of the first byte, 2, that two bytes are to follow. These two next bytes, 23, 15 relate to an extension number. The second parameter starts with 2A, the first part, 2, of this byte again indicating that a so-called type-2 parameter is concerned, thus a sequence of digits, and the second part, A, that ten bytes are to follow. In the example shown these ten bytes relate to a selected number 00, the signs FF being filler characters.

Line 9 shows the response to the transaction request of line 8; that this is a response appears from the header 81, the response being intended for service 83 having identification code 00. The function code, which is represented by the fourth byte, is 01, the number of parameters as indicated by the fifth byte is 01, and the parameter itself is 1100, this is a type-1 parameter, which stands for a one-byte transaction completion code, the code itself is 00, which stands for a successful completion.

So, a transaction message is always constructed as follows:

Byte 1:
   01: transaction request
   81: transaction response;
Byte 2: code of the service concerned; compare the above Table in this respect. Basically, 255 different services are possible.
Byte 3: identification code for this transaction relating to the service indicated by byte 2. The maximum number of identification codes for a specific service is equal to the size of the window allocated to this service.
Byte 4: the function of the service to be performed; needless to observe that this function strongly depends on the service to be performed, but is for example with service 83 the automatic reporting of a message, equal to 01 for starting the service and 02 for stopping this service. For other services the function codes that may range from 0 to 254 naturally have another meaning and can be selected freely depending on the relevant service.

Byte 5: the number of parameters to follow;

Byte 6: the first byte of the first parameter. The four least significant bits of this byte denote the length of the data sequence to follow and the four most significant bits the type of the data sequence; this can be a completion code, a digit sequence or the like.

Byte x: the first byte of every next parameter is structured in a manner equal to that of byte 6.

With the aid of the above explanation the series of transaction messages according to FIG. 3 can now be followed in a simple way and therefore, it will only be briefly discussed hereinbelow.

Line 12 shows a request for service 04, the automatic direct calling, extension 1409 being requested to be connected to extension 2358. The response to this request is found on line 13. The completion code appears to be 04 which in this service implies that the source has not assumed the proper condition for automatic direct calling. The order is repeated by the user on line 14 while it now appears that the completion code on line 15 is equal to 00, which implies that the connection has been established.

Line 16 shows an initialization request for service 02, the wake-up service. The requested window is 10 but the allocated window, as indicated on line 17, is equal to 5. On lines 18, 19 and 20 there are transaction requests for waking up extensions 1402, 1403 and 1404, transaction codes 00, 01 and 02 being issued successively. The second parameter is always a type-3 parameter which stands for a port identification, in this case the identification of port 04, which is indicated by the last byte. Port 4 in the PABX can be an automatic speech circuit for a wake-up message, but also an ordinary extension with which a receptionist can wake the guests up. On line 21 is shown the response to line 19 with completion code 05, which stands for the source being engaged, so the extension 1403 is engaged. The next request, which is found on line 22, gets the transaction identification code 01 because it is free again. The lines 25, 26 show the responses to the requests on lines 20, 22 respectively, with 00 as a completion code, which means success, whereas line 27 shows the response to line 18 with 07 as a completion code, which means that the maximum time has elapsed because extension 1402 has not responded.

FIG. 4 shows in a block diagram the structure of a PABX 21 that is connected to a TMS 23 through a data bus 22. The PABX comprises a central control unit 24 with a memory 24, an interface 25 for connecting the PABX to a number of internal lines 26; an interface 27 for connecting the PABX to a number of external telephone lines 28 and an interface 29 through which a control unit 30 can be connected by means of a data bus 31.

The TMS 23 comprises at least a central control unit 32 with a memory 32, a display unit 33 and a keyboard 34, by means of which data concerning requested services can be applied to the TMS. The requested data can be displayed on the display unit.

For the way in which communication can be effected between the TMS and the PABX for transmitting and receiving messages according to the method of the invention under the control of the central control units 24 and 32 respectively, the reader is referred to the aforementioned article from Philips Telecommunication Review.

From the foregoing it will be evident that by means of the method according to the invention a very efficient communication between two stations is feasible with respect to specific services to be performed, it likewise being feasible to interlink stations of different types, for example older and newer stations without this causing problems, because if one station knows a specific service and the other station does not, the other station, if requested to provide this specific service, only needs to react by allocating a window 0. Even if a station has a specific capacity for a specific service, it can be eschewed that communication problems arise in case a larger capacity is requested, by allocating a window size tuned to the capacity of the responding station.

It should be stressed that the specific structure of the initialization and transaction messages has been given hereinbefore only by way of example and that, depending on the specific use, within the scope of the invention not only the initialization messages but also especially transaction messages can be tuned to specific desires on a large number of points

What is claimed is:

1. A method of asynchronous data communication between first and second stations through a common communication channel, the communication relating to a plurality of services to be performed by one of the first and second stations, the method comprising the steps of:
   (a) initializing a communication link, by the first station;
   (b) transmitting an initialization request through the channel, from the first station to the second station, the initialization request comprising data representing:
      (i) a requested service; and
      (ii) a number of times n, where n is an integer greater than zero, of requested simultaneous performances of the requested service; and
   (c) sending an initialization response through the channel, from the second station to the first station, the initialization response comprising data representing:
      (i) the requested service; and
      (ii) a number of times m, where m is a non-negative integer, of allocated simultaneous performances of the requested service, for which number m simultaneous performances are feasible, where $m \leq n$.

2. The method of claim 1 wherein the initialization request and the initialization response each have respective first, second, and third bytes, the respective first bytes indicating whether an initialization request or an initialization response is concerned, the respective second bytes indicating the requested service, and the respective third bytes indicating the number n in case of an initialization request and the number m in case of an initialization response.

3. The method of claim 1 or 2 further comprising the step of performing the requested service, using a transaction, when $m > 0$.

4. The method of claim 3 wherein the transaction includes a transaction request and a transaction response, the transaction request and the transaction response each including respective first through fifth bytes, the respective first bytes indicating whether a transaction request or transaction response is concerned, the respective second bytes indicating the requested service, the respective third bytes indicating a unique identification code for the transaction, the respective fourth bytes indicating a function code of the requested service, and the respective fifth bytes indicating a number of parameters to follow.

5. The method of claim 4 wherein each parameter is represented by at least one byte, a first one of the at least one byte indicating a type of data sequence which is to follow and a length of the data sequence.

6. A station for asynchronously communicating data with another station through a common communication channel, this data relating to a plurality of services to be performed by one of the stations, the station comprising:
(a) means for transmitting an initialization request through the channel to the other station, the initialization request comprising data representing:
(i) a requested service; and
(ii) a number of times n, where n is an integer greater than zero, of requested simultaneous performances of the requested service;
(b) means for receiving an initialization request from the other station;
(c) means for sending an initialization response through the channel to the other station, the initialization response comprising data representing:
(i) the requested service; and
(ii) a number of times m, where m is a non-negative integer, of allocated simultaneous performances of the requested service, for which number m simultaneous performances are feasible, where $m \leq n$;
(d) means for receiving an initialization response from the other station; and
(e) means for determining if an initialization is successful.

7. The station of claim 6 wherein each initialization request and initialization response have respective first, second, and third bytes, the respective first bytes indicating whether an initialization request or an initialization response is concerned, the respective second bytes indicating the requested service, and the respective third bytes indicating the number n in case of an initialization request and the number m in case of an initialization response.

8. The station of claim 6 or 7 further comprising:
(a) means for transmitting a transaction request for performing the requested service, when $m > 0$;
(b) means for receiving a transaction request;
(c) means for transmitting a transaction response in response to a received transaction request; and
(d) means for receiving a transaction response from the other station.

9. The station of claim 8 wherein each transaction includes a respective transaction request and a respective transaction response, the transaction request and the transaction response each including respective first through fifth bytes, the respective first bytes indicating whether a transaction request or transaction response is concerned, the respective second bytes indicating the requested service, the respective third bytes indicating a unique indentification code for the transaction, the respective fourth bytes indicating a function code of the requested service, and the respective fifth bytes indicating a number of parameters to follow.

10. The station of claim 9 wherein each parameter is represented by at least one byte, a first one of the at least one byte indicating a type of data sequence which is to follow and a length of the data sequence.

* * * * *